(12) United States Patent
Hancock et al.

(10) Patent No.: US 6,848,245 B2
(45) Date of Patent: Feb. 1, 2005

(54) LAWN MOWER WITH IMPROVED BLADE AND BLADE HOUSING

(75) Inventors: Frank H. Hancock, Jackson, GA (US); Stephen C. Price, Barnesville, GA (US)

(73) Assignee: Snapper, Inc., McDonough, GA (US)

( * ) Notice: Subject to any disclaimer, the term of this patent is extended or adjusted under 35 U.S.C. 154(b) by 0 days.

(21) Appl. No.: 10/383,159

(22) Filed: Mar. 6, 2003

(65) Prior Publication Data

US 2003/0221404 A1 Dec. 4, 2003

Related U.S. Application Data

(60) Provisional application No. 60/362,313, filed on Mar. 6, 2002.

(51) Int. Cl.[7] .............................................. A01D 34/63
(52) U.S. Cl. ........................................ 56/255; 56/320.1
(58) Field of Search ............................ 56/320.1, 320.2, 56/255, 295, 12.7; 30/276, 300

(56) References Cited

U.S. PATENT DOCUMENTS

| | | | | |
|---|---|---|---|---|
| 3,340,682 A | * | 9/1967 | Ely | ............................. 56/295 |
| 4,567,716 A | * | 2/1986 | Makofka et al. | ............. 56/13.6 |
| 5,199,251 A | | 4/1993 | Rouse et al. | |
| 5,622,035 A | * | 4/1997 | Kondo et al. | ................ 56/12.7 |
| 5,791,131 A | | 8/1998 | Hill et al. | |
| 6,112,416 A | * | 9/2000 | Bridges et al. | ............... 30/276 |

* cited by examiner

Primary Examiner—Robert E Pezzuto
(74) Attorney, Agent, or Firm—Michael Best & Friedrich LLP (57) ABSTRACT

A grass cutting blade is provided which can be rotated in either direction while providing cutting and airlift in either direction. This can be used in cooperation with a cutting deck housing which includes a particular discharge opening and channel configuration which facilitates side discharge for one blade direction and mulching in the other. By controlling the blade direction, such as by an electric switch controlling electric blade shaft drive motor, side discharge or mulching can be had at a flip of a switch.

21 Claims, 6 Drawing Sheets

LAWN MOWER WITH IMPROVED BLADE AND BLADE HOUSING

CROSS-REFERENCE TO RELATED APPLICATIONS

The present application claims priority to pending provisional patent application No. 60/362,313, filed Mar. 6, 2002, entitled "Electric Mower with Improved Blade and Blade Housing", the entire contents of which are incorporated by reference.

TECHNICAL FIELD

The present invention relates generally to lawn mowers, and particularly relates to a lawn mower design which includes the use of a blade which can cut in two directions while providing an airlift feature in both directions. An electric wheel and blade drive is also contemplated.

BACKGROUND OF THE INVENTION

Lawn mowers are well known in the art. Improvements to same are always in demand, while at the same time understanding that costs provide practical limitations.

SUMMARY OF THE INVENTION

Generally described, the present invention relates to a lawn mower design which includes an improved blade and blade housing design. Also provided is an electrically powered wheel and blade drive.

More particularly described, the invention provides a grass cutting blade which can be rotated in either direction while providing cutting and airlift in either direction.

The invention also contemplates the use of the above-described blade in cooperation with a cutting deck housing which includes a particular discharge opening and channel configuration which facilitates side discharge for one blade direction and mulching in the other. By controlling the blade direction, such as by an electric switch controlling electric blade shaft drive motor, side discharge or mulching can be had at a flip of a switch.

The invention also contemplates the use of two such blades on counter rotating shafts, and the switching of the mounting of said blades to provide extended wear.

Therefore, it is an object of the present invention to provide an improved lawn mower design, which includes improved operating features.

It is a further object of the present invention to provide an improved lawn mower design, which includes improved cutting features.

It is a further object of the present invention to provide an improved lawn mower design, which provides efficient cutting features.

It is a further object of the present invention to provide an improved lawn mower design, which allows for extended blade use.

It is a further object of the present invention to provide an improved lawn mower cutting blade.

It is a further object of the present invention to provide an improved lawn mower cutting blade, which includes multiple applications.

Other objects, features, and advantages of the present invention will become apparent upon reading the following detailed description of the preferred embodiment of the invention when taken in conjunction with the drawings and the appended claims.

BRIEF DESCRIPTION OF THE DRAWINGS

Having thus described the invention in general terms, reference will now be made to the accompanying drawings, which are not necessarily drawn to scale, and wherein:

FIG. 1 is a partial view of a lawn mower assembly 10 according to the present invention, viewed from the right. Shown numbered are the frame 11 of the apparatus 10, and wheels 13 which are rotatably mounted relative to the frame 11. A handlebar assembly 14 and seat 15 are partially shown. An electric battery bank 20 is positioned where the gasoline motor would be in a conventional rear engine rider, and is configured to drive electric motors (not shown) which drive the rear wheels. The electric battery bank also drives two blade shaft drive motors 40 which in turn drive blades within the cutting blade housing 30. It should be understood that there are two blade shaft drive motors, each of which drive a corresponding blade shaft, to which is attached a cutting blade. These blade shaft drive motors 40 can be reversible as discussed later in this application to facilitate cutting in either direction by the corresponding blade.

FIG. 4 is a more detailed view of the second opposing end 120 of the blade 100. It should be understood that the first opposing end would look similar to this. Shown in more detail are a first cutting edge 121, a second cutting edge 122, and a raised airfoil (a.k.a. "airlift") portion 125 intermediate the two edges. As will be understood, this airfoil portion provides airlift to whichever cutting edge is in use and trails whatever cutting edge is in use and. As will also be understood, the cutting edges shown in this application may be shown as unsharpened but of course may be modified to a sharpened configuration as known in the art.

DETAILED DESCRIPTION OF THE PREFERRED EMBODIMENT

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The overall apparatus is designated as lawn cutting apparatus 10. Discussion regarding this apparatus includes the following:

| | |
|---|---|
| 10 | Lawn mower apparatus |
| 11 | frame |
| 13 | wheels |
| 14 | handlebar assembly |
| 15 | seat |
| 20 | battery bank |
| 30 | cutting blade housing |
| 31 | discharge opening |
| 32 | downwardly facing channel |
| 40 | blade shaft drive motors |
| 100 | cutting blade (first embodiment) |
| 105 | central mounting portion |
| 110 | first opposing end |
| 120 | second opposing end |
| 121 | first cutting edge |
| 122 | second cutting edge |
| 125 | raised airfoil (a.k.a. "airlift") portion |
| 200 | cutting blade (second embodiment) |
| 210 | first opposing end (not shown) |
| 220 | second opposing end |
| 221 | first cutting edge |
| 222 | second cutting edge |
| 225 | raised airfoil (a.k.a. "airlift") portion |

Overall Apparatus 100

Figure 1:
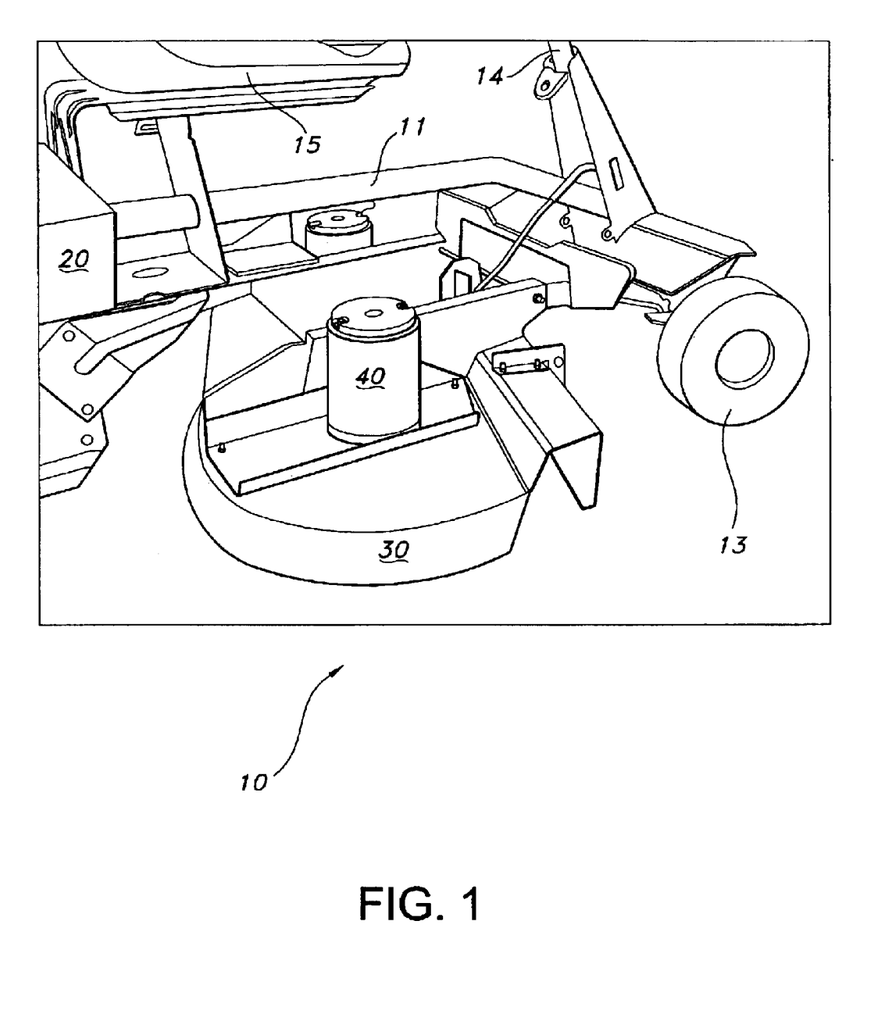

Reference is now made to FIG. 1 in order to describe the overall characteristics of the lawn mower assembly 10 of the present invention. The assembly 10 includes a frame 11, wheels 13 which are rotatably mounted relative to the frame 11, a handlebar assembly 14, a seat 15, and an electric battery bank 20, which is configured to drive electric motors (not shown) which drive the wheels, as well as to drive other elements such as blades.

The lawn mower assembly 10 of the present invention includes a cutting blade housing 30 and at least one blade shaft drive motor 40. It should be understood that in the embodiment shown there are two blade shaft drive motors, each of which drives a corresponding blade shaft, to which is attached a cutting blade. These blade shaft drive motors 40 are reversible in order to allow for selection of the rotational direction of the blades by the flip of a switch or other suitable control means.

It should be understood that other configurations could be used which include the driving of more than one blade per motor, with power transferred thereto by means of suitable drive belts or the like. Mechanical means could also be used in order to provide the reversing of the blade(s).

The Cutting Blade Housing

Figure 2:
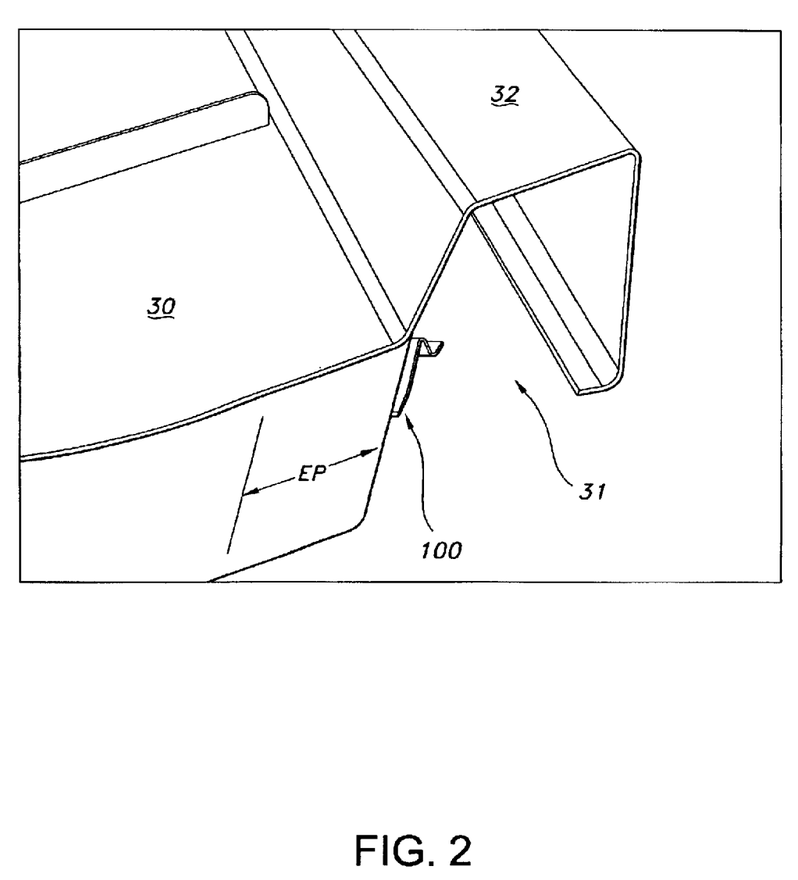
FIG. 2 is a more detailed view of a portion of the apparatus, showing a part of the cutting blade housing 30, and a portion of the downwardly facing channel 32 positioned at the front of the cutting blade housing. Also shown is a discharge opening 31, which is at the end of the downwardly facing channel 32. Shown very partially (just the tip is showing) is a blade 100 within the cutting housing. An exemplary Extended Portion "EP" of the cutting blade housing is also shown.

Reference is now also made to FIG. 2, which is a more detailed view of a portion of the apparatus, showing a part of the cutting blade housing 30, and a portion of the downwardly facing channel 32 positioned at the front of the cutting blade housing. Also shown is a discharge opening 31, which is at the end of the downwardly facing channel 32. Shown very partially (just the tip is showing) is a blade 100 within the cutting housing. An exemplary Extended Portion "EP" of the cutting blade housing is also shown.

As will be discussed in later detail, the outer baffle extends forwardly further (the width of "EP" in FIG. 2) than normally would be the case on a conventional mower deck to accommodate for times when the deck is being used for mulching. To compensate for the resulting discharge width reduction, the discharge opening was raised higher to give adequate volume for good side discharging when needed.

The Blades 100, 200

Two different blades 100, 200 will now be discussed. These blades will be referenced as first embodiment blade 100 (see FIGS. 3–5), and a second embodiment blade 200 (see FIGS. 6A and 6B). However, it will readily be recognized that these two blades include many similar features and operate similarly.

Figure 3:
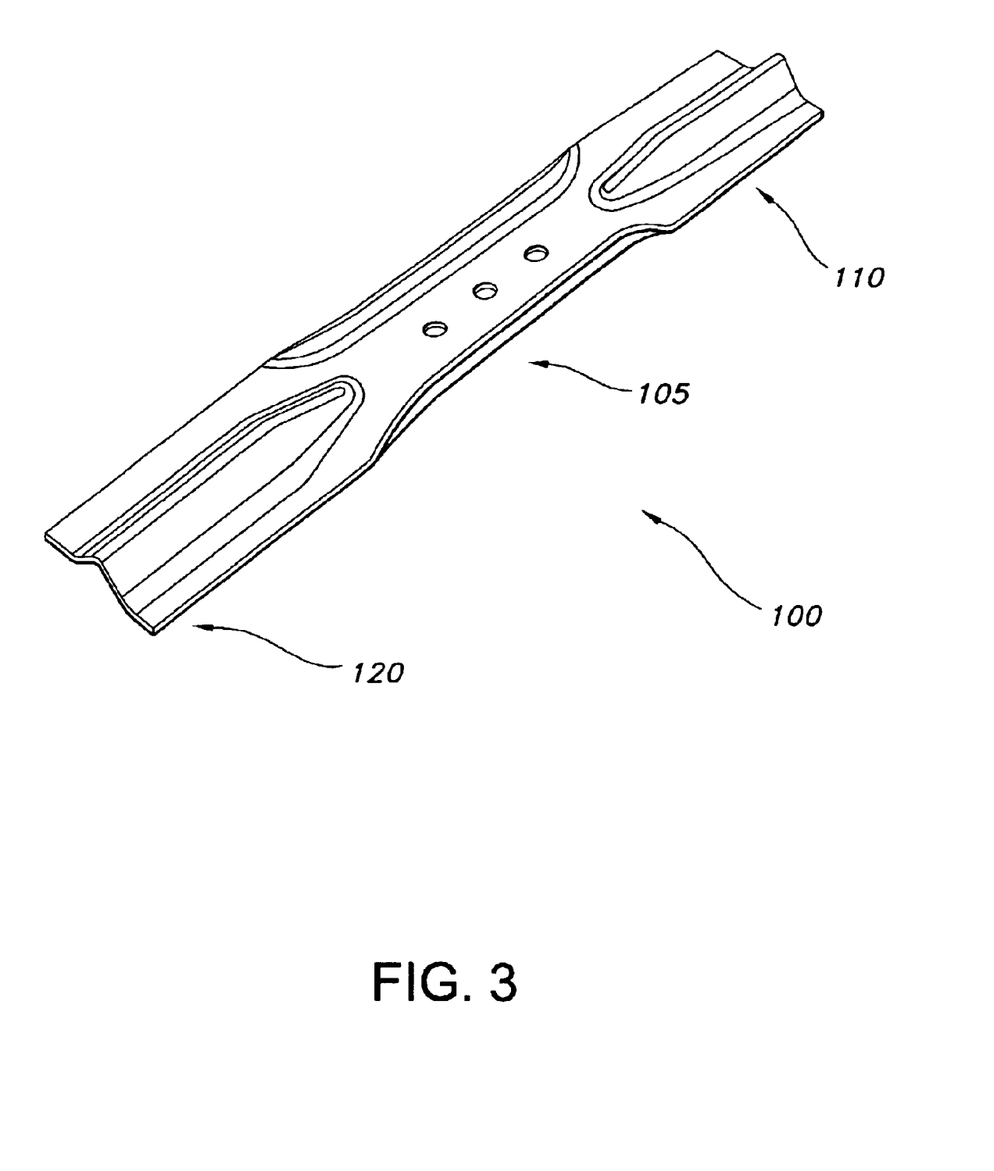
FIG. 3 is an isolated pictorial view of a first embodiment cutting blade 100 according to the present invention. Blade 100 includes a central mounting portion 105; a first opposing end 110 and a second opposing end 120.
Figure 4:
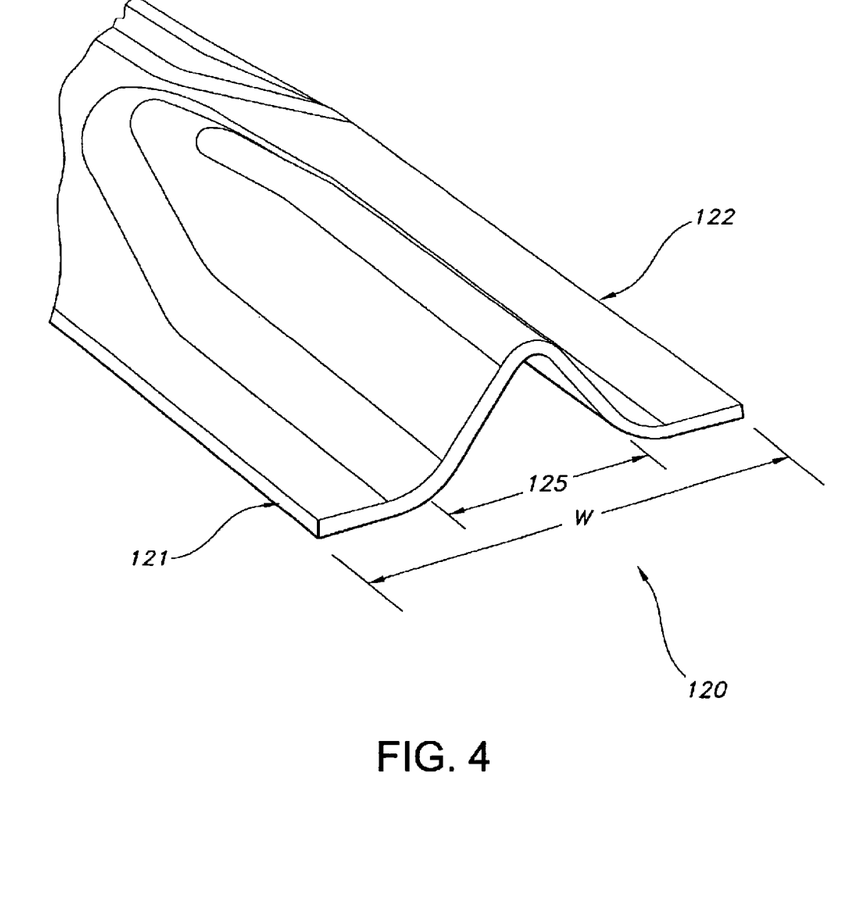

Blade 100 will first be discussed in reference to FIGS. 3–5. Generally described, the blade 100 is a double edge blade with a channel-shaped airfoil portion 125 (a.k.a "airlift") in the middle. The airfoil portion 125 may be thought of as being shaped as an inverted "V".

The blade 100 is substantially elongate and straight, and, in one embodiment, is formed of a single "blank" of sheet-like metal. After or during the stamping process, the blade 100 is formed as shown for example in FIG. 3. Sharpening of the cutting edges can be done later as needed and as known in the art.

The blade 100 is substantially elongate, and includes a central mounting portion 105 (the central mounting portion itself is conventional) from which extend two opposing ends, 110, 120. These ends are substantially similar, and therefore one will be discussed by way of example.

The end 120 includes two cutting edges 121, 122, which are substantially parallel to each other. Between the two cutting edges is the raised airfoil portion 125 (which serves to provide airlift), which cooperates with the leading cutting edge regardless of the rotational direction.

As discussed elsewhere in this application, in one operational mode the blade 100 is configured to be driven in two opposite rotational cutting directions without requiring re-mounting.

It may be understood that when the blade 100 rotates in a first rotational direction, cutting edge 121 could be the "leading" cutting edge and cutting edge 122 the "trailing" cutting edge. The leading cutting edge is the one that does most, if not all, of the cutting of the grass or other vegetation.

Under this scenario, when the cutting blade 100 is rotating in a second direction, the cutting edge 122 is the leading edge, whereas the cutting edge 121 is the trailing cutting edge.

Figure 6A:
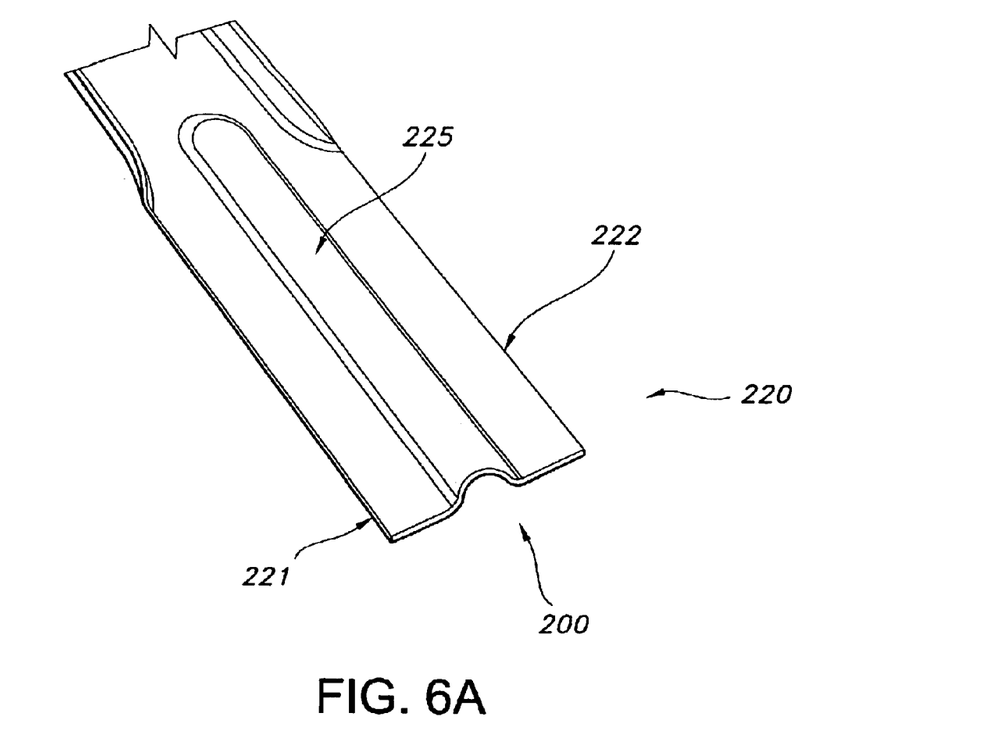
FIG. 6A is a view of a portion of a second embodiment blade 200. It may be seen that the second embodiment blade 200 includes a raised airfoil portion 225 which is more round (approximately semicircular in cross section) than the previously discussed embodiment which is more angular. Shown are first and second cutting blades, 221, 222 of the second opposing end 220 of the cutting blade. The first opposing end is not shown but would look similarly.
Figure 6B:
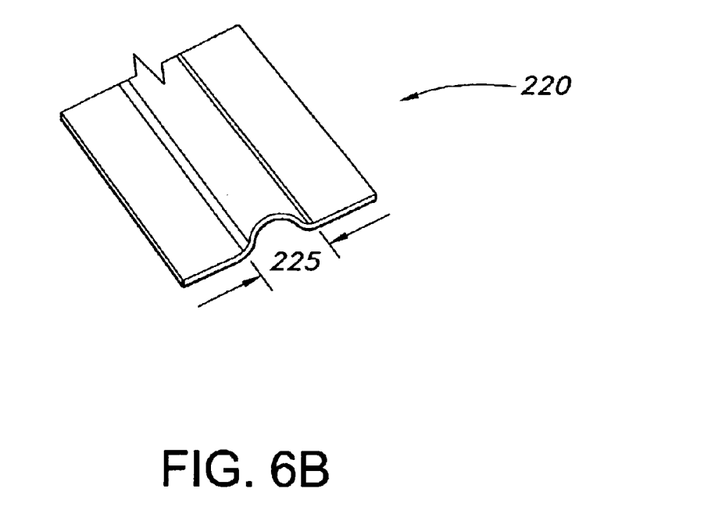
FIG. 6B is another partial view of the second embodiment blade, showing an end which could be the first opposing end 210 or the second opposing end 220.

A similar second embodiment blade 200 is also contemplated as shown in FIGS. 6A and 6B. The blade 200 is substantially elongate, and includes a central mounting portion from which extend two opposing ends, 210, 220. These ends are substantially similar, and therefore one will be discussed by way of example. The end 220 includes two cutting edges 221, 222, which are substantially parallel to each other. Between the two cutting edges is a raised portion 225, which serves to function as an airfoil (a.k.a. "airlift"), which cooperates with the leading cutting edge regardless of the rotational direction. The raised portion 225 may be thought of as being shaped as an inverted "U".

The blades 100, 200 are capable of running clockwise or counterclockwise to allow it to cut in either direction without having to be remounted. In one embodiment of the invention which includes a cutting deck as described below, this allows for the selection of a side discharge feature (e.g., as the blade rotates clockwise) or a mulching feature (e.g., as the blade rotates counterclockwise) at the flip of a switch, with no other changeover required such as the addition of mulching elements, replacement of blade, etc.

The drive means for the blade could be provided by suitably controllable electric motors, which can be selectively reversed. However the blades could be driven or coupled with a mechanical device on the belt drive deck to allow some other type of mechanical reversal.

Cooperation of Deck and Blade

The cutting blade housing (a.k.a. "deck") 30 is configured to be used in combination with a reversible blade such as described earlier. It should be understood that when the blade is rotated in a first, conventional discharge, direction, the blade severs clippings, which are then discharged through the side discharge opening 31. However, when the blade is reversed (without removing or remounting delayed) it is used in its "mulching" configuration, in which preferably the blade cuts grass clippings, which are then "mulched" within the cutting deck by additional cutting or thrashing by the blade. It should be understood that for a given time and rotational speed of the blade, more clippings exit the side discharge opening in the conventional discharge mode than in the mulching mode.

The "movement" of the sidewall baffle (movement as in terms of modifying the design, the baffle itself does not in operation move relative to the deck) has been provided to provide improved mulching when the blade is in its "reverse" or "mulching" mode, in that the deck sidewall extends further forward, which tends to cause the clippings to remain in the deck. However, when the blade is rotating in its "discharge" direction, the height of the deck compensates to allow the same volume to exit, notwithstanding the reduced width of the discharge opening necessitated by the movement forward of the baffle.

Figure 5:
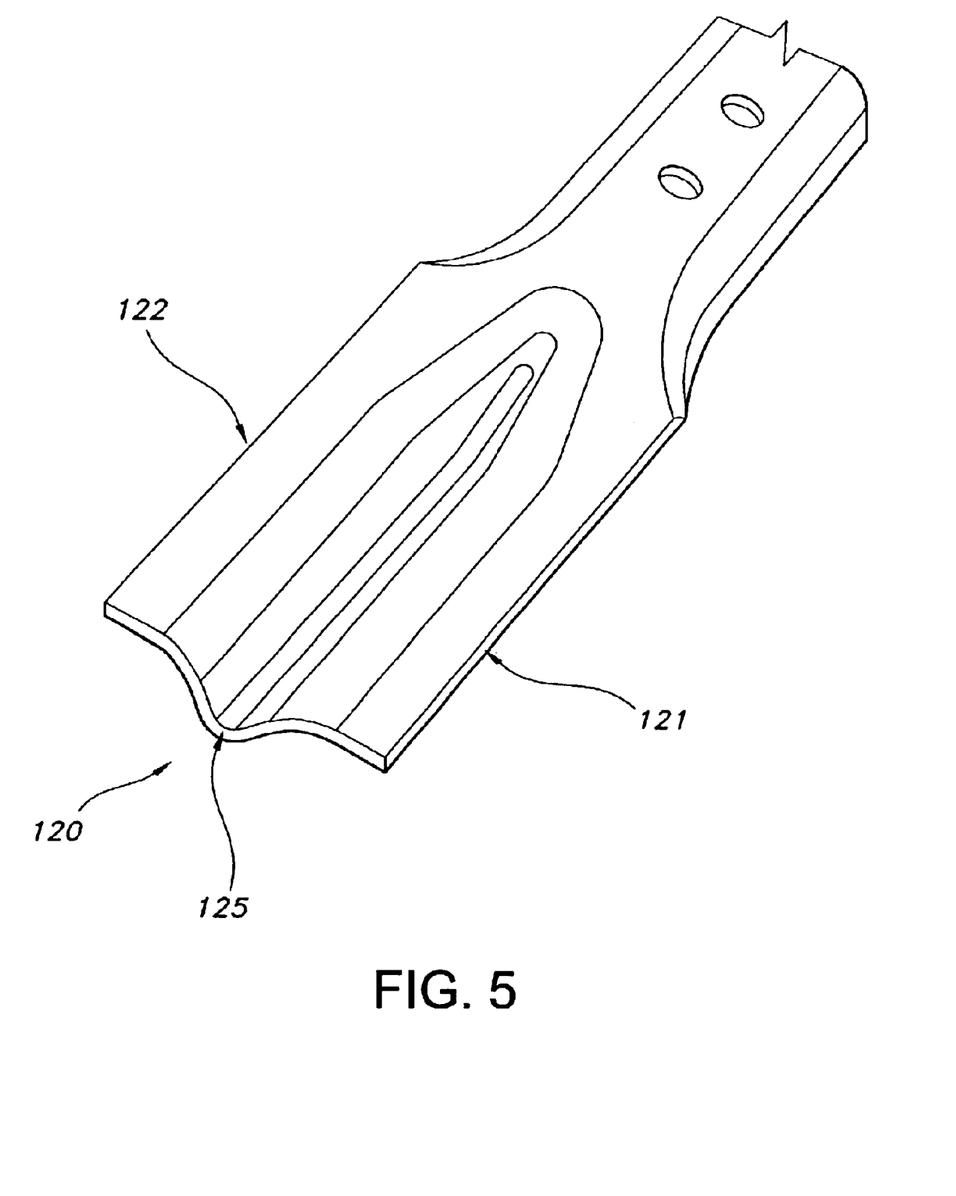
FIG. 5 is a view similar to that of FIG. 7, except the blade has been turned upside down for viewing. Again shown are the cutting edges 121, 122, and the raised airfoil portion 125.

Reference is specifically made to FIG. 5 to show by illustrative means the general manner in which the sidewall of the cutting housing has been "moved forward" a length "EP" (for "Extended Portion") in order to provide retention of the clippings during mulching.

A side deflector (not shown) will be located over the deflector to accommodate side discharge requirements, but when the operator wants to mulch with this mower, the operator will just flip a switch and the mower goes into a mulching mode. The operator doesn't have to do anything to the deck—even the deflector can remain in place.

Applications

There are other applications for this blade, such as a rear discharge mower where one blade runs counterclockwise and the other blade runs clockwise. In that application use of this blade would allow a user to extend blade life because once the user wore out the cutting edge on one side, the other side could be used by remounting the blades. In other words, the blades could "swap sides" in essence switching the shafts they are mounded on. Then the deck would be cutting on its new unused side just to extend the blade life. In this case, the rotational direction is not reversed.

Other Operating Features

For the record, the inventor has also noted during testing that the wear characteristics of this blade design are quite good, when tested with sand as known in the art.

Options and Alternatives

The height of the raised airfoil portion depends on what kind of airflow is desired. However, the height could be lowered or raised depending on the requirements of the particular application.

As may be, the intermediate raised portion may take several forms. In FIGS. 2–5, the form of 125 is generally triangular. In FIGS. 6A and 6B, the form of 225 in the second embodiment blade 200 is generally semicircular.

It should also be understood that although one electric motor per blade was disclosed above, other alternative configurations could be included which include more than one blade per motor, with suitable drive belts or other known power transmission means used to connect the motor to the blades.

Conclusion

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A grass cutting blade for use in conjunction with a device for cutting grass or other vegetation into clippings, said grass cutting blade comprising:
    a mounting portion for mounting said grass cutting blade relative to said device such that said grass cutting blade can rotate about a substantially vertical axis;
    a first end extending in a first direction from said mounting portion; and
    a second end extending in a second direction from said mounting portion, said second direction being substantially opposite to said first direction, said second end itself comprising:
        a first cutting edge;
        a second cutting edge directed generally opposite to said first cutting edge; and
        an airfoil portion positioned between said first and second cutting edges,
        said airfoil portion configured to trail said first cutting edge and to provide airlift for clippings cut by said first cutting edge when said blade is rotated in a first direction, and said airfoil portion configured to trail said second cutting edge and to provide airlift for clippings cut by said second cutting edge when said blade is rotated in a second direction, said second direction being opposite to said first direction.

2. The grass cutting blade as claimed in claim 1, wherein said first and second cutting edges of said second end each include a substantially straight cutting edge portion, said cutting edge portions being substantially parallel.

3. The grass cutting blade as claimed in claim 2, wherein said airfoil portion is elongate and has a longitudinal axis substantially parallel to said first and second cutting edges.

4. The grass cutting blade as claimed in claim 3, wherein said airfoil portion has a transverse cross section which is shaped as an inverted "V".

5. The grass cutting blade as claimed in claim 3, wherein said airfoil portion has a transverse cross section which is shaped in a substantially semicircular manner.

6. The grass cutting blade as claimed in claim 1, wherein said airfoil portion has a transverse cross section which is shaped as an inverted "V".

7. The grass cutting blade as claimed in claim 1, wherein said airfoil portion has a transverse cross section which is shaped in a substantially semicircular manner.

8. A grass cutting blade and housing combination for use in conjunction with a device for cutting grass or other vegetation, said grass cutting blade and housing combination comprising:
    a grass cutting blade housing for partially enclosing said grass cutting blade, said grass cutting blade housing including a discharge opening; and a grass cutting blade, said grass cutting blade itself comprising:

a mounting portion for mounting said grass cutting blade relative to said device such that said grass cutting blade can rotate about a substantially vertical axis;

a first end extending in a first direction from said mounting portion; and a second end extending in a second direction from said mounting portion, said second direction being substantially opposite to said first direction, said second end itself comprising:

a first cutting edge;

a second cutting edge directed generally opposite to said first cutting edge; and an airfoil portion positioned between said first and second cutting edges, said blade and housing configured to cooperate such that said airfoil portion trails said first cutting edge and provides airlift for clippings cut by said first cutting edge when said blade is rotated in a first direction and provides a mulching function in which a first amount of clippings are discharged through said discharge opening of said grass cutting blade housing, and said blade and said housing configured to cooperate such that said airfoil portion of said blade trails said second cutting edge and provides an airlift function for clippings cut by said second cutting edge when said blade is rotated in a second direction opposite said first direction in which a second amount of clippings are discharged through said discharge opening of said grass cutting blade housing at a rate greater than said first amount for the same rotation speed of said blade.

9. The grass cutting blade and housing combination as claimed in claim 8, wherein said first and second cutting edges of said second end each include a substantially straight cutting edge portion, said cutting edge portions being substantially parallel.

10. The grass cutting blade and housing combination as claimed in claim 9, wherein said airfoil portion is elongate and has a longitudinal axis substantially parallel to said first and second cutting edges.

11. The grass cutting blade and housing combination as claimed in claim 10, wherein said airfoil portion has a transverse cross section which is shaped as an inverted "V".

12. The grass cutting blade and housing combination as claimed in claim 10, wherein said airfoil portion has a transverse cross section which is shaped in a substantially semicircular manner.

13. The grass cutting blade and housing combination as claimed in claim 8, wherein said airfoil portion has a transverse cross section which is shaped as an inverted "V".

14. The grass cutting blade as claimed in claim 8, wherein said airfoil portion has a transverse cross section which is shaped in a substantially semicircular manner.

15. The grass cutting blade and housing combination as claimed in claim 8, wherein said housing includes a forwardly positioned, downwardly-directed, channel leading to said discharge opening of said housing.

16. A method for cutting grass or other vegetation with a grass cutting blade, said method comprising the steps of:

providing a cutting blade with a central mounting portion and two opposing ends, at least one of said ends including opposing first and second cutting edges and an airfoil portion positioned between said opposing first and second cutting edges;

rotating said cutting blade in a first direction such that said first cutting edge is a leading cutting edge and said second cutting edge is a trailing cutting edge and such that said airfoil portion trails and provides an airlift function for said first cutting edge; and rotating said cutting blade in a second direction such that said second cutting edge is a leading cutting edge and said first cutting edge is a trailing cutting edge and such that said airfoil portion trails and provides an airlift function for said second cutting edge.

17. The method as claimed in claim 16, wherein said first direction is opposite to said second direction.

18. A method for cutting grass or other vegetation into clippings with a grass cutting blade used in combination with a grass cutting blade housing, said method comprising the steps of:

providing a grass cutting blade with a central mounting portion and two opposing ends, at least one of said ends including opposing first and second cutting edges and an airfoil portion positioned between said opposing first and second cutting edges;

providing a grass cutting blade housing partially enclosing said grass cutting blade and including a discharge opening;

rotating said cutting blade in a first direction such that said first cutting edge is a leading cutting edge and said second cutting edge is a trailing cutting edge, such that said airfoil portion trails and provides an airlift function for said first cutting edge, and such that clippings are discharged at a first rate through said discharge opening; and rotating said cutting blade in a second direction such that said second cutting edge is a leading cutting edge and said first cutting edge is a trailing cutting edge, such that said airfoil portion trails and provides an airlift function for said second cutting edge, and such that clippings are discharged at a second rate through said discharge opening, said second rate being less than said first rate.

19. The method as claimed in claim 18, wherein said first direction is opposite to said second direction.

20. A method for cutting grass or other vegetation with a grass cutting blade used in conjunction with a grass cutting device, said method comprising the steps of:

providing a cutting blade with a central mounting portion and two opposing ends, at least one of said ends including opposing first and second cutting edges and an airfoil portion positioned between said opposing first and second cutting edges;

rotating said cutting blade in a first direction while said central mounting portion is mounted to a first portion of said cutting device such that said first cutting edge is a leading cutting edge and said second cutting edge is a trailing cutting edge and such that said airfoil portion trails and provides an airlift function for said first cutting edge;

dismounting said central mounting portion of said cutting blade from said first portion of said cutting device;

mounting said central mounting portion of said cutting blade to a second portion of said cutting device; and rotating said cutting blade in a said second direction such that said second cutting edge is a leading cutting edge and said first cutting edge is a trailing cutting edge and such that said airfoil portion trails and provides an airlift function for said second cutting edge.

21. A method for cutting grass or other vegetation with a grass cutting blade used in conjunction with a grass cutting device, said method comprising the steps of:

providing first and second cutting blades, each with a central mounting portion and two opposing ends, each blade having at least one of said ends including opposing first and second cutting edges and an airfoil portion positioned between said opposing first and second cutting edges;

rotating said first cutting blade in a first direction while its central mounting portion is mounted to a first portion of said cutting device such that said first cutting edge of said first cutting blade is a leading cutting edge and said second cutting edge of said first cutting blade is a trailing cutting edge and such that said airfoil portion of said first cutting blade trails and provides an airlift function for said first cutting edge of said first cutting blade, while at the same time rotating said second cutting blade in a second direction while its central mounting portion is mounted to a second portion of said cutting device such that said second cutting edge of said second cutting blade is a leading cutting edge and said first cutting edge of said second cutting blade is a trailing cutting edge and such that said airfoil portion of said second cutting blade trails and provides an airlift function for said second cutting edge of said first cutting blade; and reversing the mounting of said two blades.

* * * * *